(12) United States Patent
Marois et al.

(10) Patent No.: US 9,545,777 B2
(45) Date of Patent: *Jan. 17, 2017

(54) CORROSION-RESISTANT BRAZING SHEET PACKAGE

(71) Applicant: NOVELIS INC., Atlanta, GA (US)

(72) Inventors: Pierre Henri Marois, Kingston (CA); Kevin Michael Gatenby, Johns Creek, GA (US); Andrew D. Howells, Kingston (CA)

(73) Assignee: Novelis Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/206,133

(22) Filed: Mar. 12, 2014

(65) Prior Publication Data

US 2014/0272461 A1 Sep. 18, 2014

Related U.S. Application Data

(60) Provisional application No. 61/779,149, filed on Mar. 13, 2013.

(51) Int. Cl.
*B32B 15/01* (2006.01)

(52) U.S. Cl.
CPC ........ *B32B 15/016* (2013.01); *Y10T 428/1241* (2015.01); *Y10T 428/12354* (2015.01);
(Continued)

(58) Field of Classification Search
CPC ............... Y10T 428/12764; Y10T 428/12736; Y10T 428/12583; Y10T 428/1241; Y10T 428/12417; Y10T 428/12396; Y10T 428/12375; Y10T 428/12354; Y10T 428/13; C22C 21/00; B32B 15/016; B32B 15/017; B32B 15/043; B32B 15/20
(Continued)

(56) References Cited

U.S. PATENT DOCUMENTS 4,235,628 A 11/1980 Althoff et al.
4,649,087 A 3/1987 Scott et al.
(Continued)

FOREIGN PATENT DOCUMENTS

EP 718072 6/1996
EP 712681 2/2000
(Continued)

OTHER PUBLICATIONS

Matweb Aluminum 4045, downloaded from www.matweb.com on Sep. 30, 2014, no date, 2 pages.*
(Continued)

*Primary Examiner* — Michael E La Villa
(74) *Attorney, Agent, or Firm* — Kilpatrick Townsend & Stockton, LLP

(57) ABSTRACT

This application discloses a corrosion-resistant brazing sheet package for use in manufacturing tubing. The brazing sheet package includes a core layer of aluminum-containing alloy comprising from 0.1 wt % to 0.2 wt % of titanium. The core layer has a first side and a second side. The first side of the core layer is adjacent to a first cladding layer to form a first interface. The second side of the core layer is adjacent to a second cladding layer to form a second interface. The first cladding layer and the second cladding layer each include from 2.5 wt % to 4.0 wt % of zinc.

19 Claims, 10 Drawing Sheets

(52) U.S. Cl.
CPC .......... *Y10T 428/12375* (2015.01); *Y10T 428/12396* (2015.01); *Y10T 428/12417* (2015.01); *Y10T 428/12583* (2015.01); *Y10T 428/12736* (2015.01); *Y10T 428/12764* (2015.01); *Y10T 428/13* (2015.01)

(58) Field of Classification Search
USPC ....... 428/654, 598, 603, 604, 641, 650, 34.1
See application file for complete search history.

(56) References Cited

U.S. PATENT DOCUMENTS

| | | |
|---|---|---|
| 5,037,707 A | 8/1991 | Fortin et al. |
| 5,041,343 A | 8/1991 | Fortin et al. |
| 6,019,939 A | 2/2000 | Gray et al. |
| 6,261,706 B1 | 7/2001 | Fukuda et al. |
| 6,294,272 B2 | 9/2001 | Söntgerath et al. |
| 6,403,232 B1 | 6/2002 | Okamoto et al. |
| 6,451,453 B1 | 9/2002 | Kucza et al. |
| 7,225,932 B2 | 6/2007 | Gencer |
| 7,226,669 B2 | 6/2007 | Benedictus et al. |
| 7,387,844 B2 | 6/2008 | Ueda et al. |
| 7,407,714 B2 | 8/2008 | Haller et al. |
| 7,514,155 B2 | 4/2009 | Benedictus et al. |
| 7,608,345 B2 | 10/2009 | Bürger et al. |
| 8,247,082 B2 | 8/2012 | Ueda et al. |
| 8,247,083 B2 | 8/2012 | Izumi et al. |
| 8,247,084 B2 | 8/2012 | Kimura et al. |
| 2001/0010866 A1 | 8/2001 | Sontgerath et al. |
| 2002/0034653 A1 | 3/2002 | Okamoto et al. |
| 2003/0029529 A1 | 2/2003 | Ren |
| 2003/0121572 A1 | 7/2003 | Kucza et al. |
| 2005/0011630 A1 | 1/2005 | Anderson et al. |
| 2005/0064226 A1 | 3/2005 | Benedictus et al. |
| 2005/0221111 A1 | 10/2005 | Ekstrom et al. |
| 2006/0231170 A1 | 10/2006 | Parson et al. |
| 2007/0122648 A1* | 5/2007 | Vieregge et al. .......... 428/654 |
| 2008/0003451 A1* | 1/2008 | Suzuki et al. ............. 428/654 |
| 2009/0020585 A1 | 1/2009 | Fukumoto et al. |
| 2011/0287276 A1 | 11/2011 | Izumi et al. |
| 2012/0129003 A1 | 5/2012 | Ando et al. |
| 2014/0272460 A1 | 9/2014 | Howells et al. |

FOREIGN PATENT DOCUMENTS

| | | |
|---|---|---|
| EP | 2075083 | 7/2009 |
| EP | 2177638 | 4/2010 |
| EP | 2253726 | 11/2010 |
| EP | 1730320 | 5/2011 |
| EP | 2431121 | 3/2012 |
| EP | 2435207 | 4/2012 |
| EP | 1580286 | 5/2013 |
| JP | H08 283891 A | 10/1996 |
| JP | H09-095749 A | 4/1997 |
| JP | H11-293372 A | 10/1999 |
| JP | 2000-202682 A | 7/2000 |
| JP | 2006-015376 A | 1/2006 |
| JP | 2006-144041 A | 6/2006 |
| JP | 2010-209445 A | 9/2010 |
| JP | 2011-219831 A | 11/2011 |
| WO | 9422633 | 10/1994 |
| WO | 2006041518 | 4/2006 |
| WO | 2010132018 | 11/2010 |
| WO | 2014165017 | 10/2014 |

OTHER PUBLICATIONS

The Aluminum Association, "International Alloy Designations and Chemical Composition Limits for Wrought Aluminum and Wrought Aluminum Alloys," published by the Aluminum Association, revised Feb. 2009.
PCT/US2014/024142, "Invitation to Pay Additional Search Fees and Partial Search Report", Jun. 24, 2014, 5 pages.
PCT/US2014/024142, "International Search Report and Written Opinion", Oct. 6, 2014, 14 pages.
U.S. Appl. No. 14/206,058, "Non-Final Office Action" mailed Dec. 23, 2015, 13 pages.
U.S. Appl. No. 14/206,058, Final Office Action mailed Jun. 10, 2016, 10 pages.
U.S. Appl. No. 14/206,058, Advisory Action mailed Jul. 29, 2016, 6 pages.
Japanese Patent Application No. 2016-501429, Office Action dated Oct. 25, 2016.

* cited by examiner

Non Zn-containing clad          1wt% Zn-containing clad

PDT
X902 baseline
Non Zn-containing clad

PDV
Hi Si, Hi Ti X902
Non Zn-containing clad

US 9,545,777 B2

CORROSION-RESISTANT BRAZING SHEET PACKAGE

CROSS-REFERENCE TO PRIORITY APPLICATIONS

This application claims priority to U.S. Provisional Application No. 61/779,149, filed Mar. 13, 2013, which is incorporated herein by reference in its entirety.

FIELD OF THE INVENTION

The present invention provides a corrosion-resistant brazing sheet package for use in manufacturing tubing. The invention relates to use of the tubing in heat exchangers.

BACKGROUND

Metal tubing used in heat exchangers is prone to exhibit corrosion over time. To address this problem, some commercially available forms of tubing are made from a zincated microport extrusion with a formed sheet product. In this process, the microport tubes are usually sprayed with pure zinc as the tubes exit the extrusion press. However, the coverage of the tubes with zinc can be inconsistent and the tubes are expensive to produce. Furthermore, these extrusions can exhibit softness in the post braze condition.

SUMMARY

The present invention solves these problems by providing a corrosion-resistant brazing package for use in manufacturing tubing. The brazing package includes a multi-layer metal sheet.

The multi-layer metal sheet comprises a core layer of aluminum-containing alloy comprising from 0.1 wt % to 0.2 wt % of titanium, wherein the core layer has a first side and a second side; a first cladding layer comprising from 2.5 wt % to 4.0 wt % of zinc; and a second cladding layer comprising from 2.5 wt % to 4.0 wt % of zinc. In the multi-layer metal sheet, the first side of the core layer is adjacent to the first cladding layer to form a first interface and the second side of the core layer is adjacent to a second cladding layer to form a second interface.

Optionally, the core layer is made of an alloy comprising up to 0.25 wt % of Si, up to 0.25 wt % of Fe, from 0.5 to 0.6 wt % of Cu, from 1.4 to 1.6 wt % of Mn, from 0.06 to 0.14 wt % of Mg, up to 0.05 wt % of Cr, up to 0.04 wt % of Zn, from 0.1 to 0.2 wt % of Ti, up to 0.05 wt % of Sr, up to 0.15 wt % of impurities, and the balance aluminum. Optionally, the first cladding layer and the second cladding layer are made of an alloy comprising from 6 to 13 wt % of Si, up to 0.4 wt % of Fe, up to 0.1 wt % of Cu, up to 0.1 wt % of Mn, up to 0.15 wt % of Mg, up to 0.05 wt % of Cr, from 2.5 to 4.0 wt % of Zn, up to 0.05 wt % of Ti, up to 0.02 wt % of Sr, up to 0.15 wt % of impurities, and the balance aluminum.

The sheet described herein can further comprise a fin. The fin can be a zinc-containing fin or an aluminum-containing fin. Optionally, the zinc-containing fin can contain zinc in an amount of 1.5 wt % or more. Further described herein is a tube made of the sheet as described herein.

DETAILED DESCRIPTION

Figure 1:
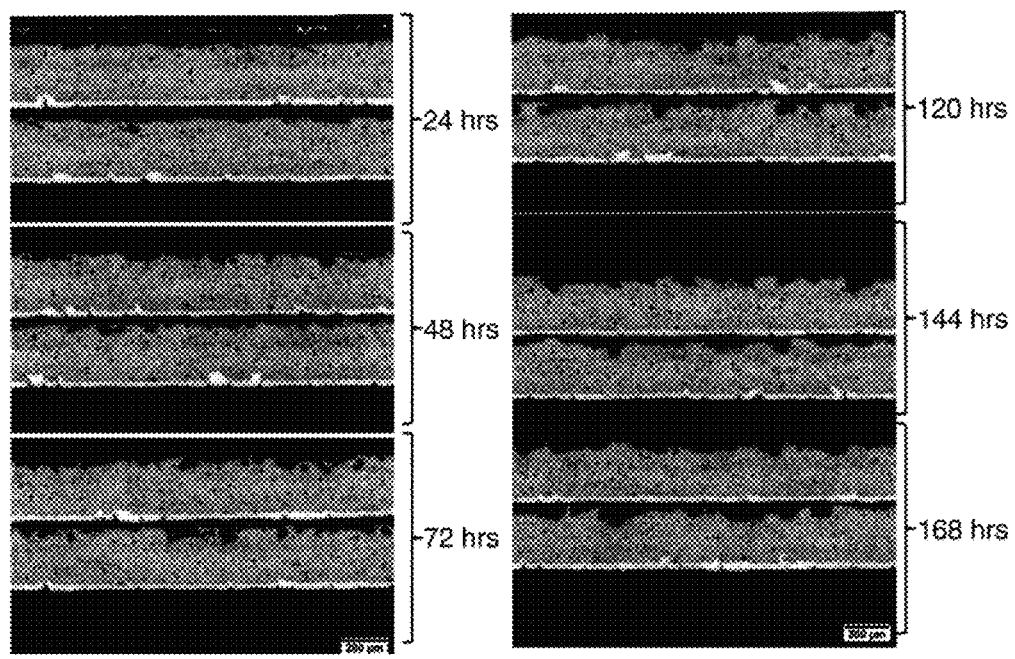
FIG. 1 contains photomicrographs showing Sample AB916 after immersion in a 0.1M HCl solution for 24 hours, 48 hours, 72 hours, 120 hours, 144 hours, and 168 hours.

The present invention solves these problems by providing a corrosion-resistant brazing sheet package for use in manufacturing tubing. The brazing sheet package includes a core layer of aluminum-containing alloy having a first side and a second side. The first side of the core layer is adjacent to a first cladding layer to form a first interface. The second side of the core layer is adjacent to a second cladding layer to form a second interface. As understood to those of skill in the art, the core layer is usually the term given to the layer whose primary purpose is to influence the bulk mechanical properties of the overall sheet product. The cladding layers refer to the layers that dictate surface characteristics (e.g., corrosion resistance). Some of the alloys described herein are identified using the number designation system as provided in "International Alloy Designations and Chemical Composition Limits for Wrought Aluminum and Wrought Aluminum Alloys," published by The Aluminum Association, revised February 2009, which is hereby incorporated by reference in its entirety.

Core Layer

The core layer is an aluminum-containing alloy. In some embodiments, alloys designated as "X900 series" alloys are suitable for use as the core layer. Optionally, an alloy suitable for use as the core layer includes an alloy similar in composition to alloy X901, but containing a higher percentage of Ti. Additional Ti can be added to result in a total amount of Ti of from 0.1 wt % to 0.2 wt %, based on the core layer, to result in an alloy designated as alloy X912. The elemental composition of alloy X912 is provided in Table 1.

TABLE 1

| Element | Weight Percentage (wt %) |
|---|---|
| Si | Up to 0.25 |
| Fe | Up to 0.25 |
| Cu | 0.5-0.65 |
| Mn | 1.4-1.6 |
| Mg | 0.06-0.14 |
| Cr | Up to 0.05 |
| Zn | Up to 0.04 |
| Ti | 0.1-0.2 |
| Sr | 0.05 |
| Impurities | Up to 0.15 Total |
| Al | Remainder |

In some embodiments, the core layer includes up to 0.25 wt % silicon (Si). For example, the core layer can include 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, 0.2 wt %, 0.21 wt %, 0.22 wt %, 0.23 wt %, 0.24 wt %, or 0.25 wt % Si. The core layer can also include up to 0.25 wt % iron (Fe). In some embodiments, the core layer can include 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, 0.2 wt %, 0.21 wt %, 0.22 wt %, 0.23 wt %, 0.24 wt %, or 0.25 wt % Fe. The core layer can further include copper (Cu) in an amount of from 0.5 wt % to 0.65 wt %. For example, the core layer can include 0.5 wt %, 0.51 wt %, 0.52 wt %, 0.53 wt %, 0.54 wt %, 0.55 wt %, 0.56 wt %, 0.57 wt %, 0.58 wt %, 0.59 wt %, 0.6 wt %, 0.61 wt %, 0.62 wt %, 0.63 wt %, 0.64 wt %, or 0.65 wt % Cu.

The core layer can further include manganese (Mn) in an amount of from 1.4 wt % to 1.6 wt % (e.g., 1.4 wt %, 1.5 wt %, or 1.6 wt %). Magnesium (Mg) can be included in the core layer in an amount of from 0.06 wt % to 0.14 wt %. For example, Mg can be included in the core layer in an amount of from 0.06 wt %, 0.07 wt %, 0.08 wt %, 0.09 wt %, 0.1 wt %, 0.11 wt %, 0.12 wt %, 0.13 wt %, or 0.14 wt %. Titanium (Ti) can be included in the core layer in an amount of from 0.1 wt % to 0.2 wt % (e.g., 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, or 0.2 wt %). The presence of Ti in the core layer, among other components, results in a core layer with corrosion resistance properties. Optionally, the core layer can further include up to 0.05 wt % each of chromium (Cr) and/or strontium (Sr). For example, the core layer can include 0.01 wt %, 0.02 wt %, 0.03 wt %, 0.04 wt %, or 0.05 wt % of Cr. The core layer can include 0.01 wt %, 0.02 wt %, 0.03 wt %, 0.04 wt %, or 0.05 wt % of Sr. Optionally, the core layer can include up to 0.04 wt % of Zinc (Zn). For example, the core layer can include 0.01 wt %, 0.02 wt %, 0.03 wt %, or 0.04 wt % of Zn. In some embodiments, the core layer includes trace amounts of one or more of Cr, Zn, and Sr. As used herein, trace amounts means that the element is present in an amount of less than 0.01 wt % (e.g., less than 0.005 wt %, less than 0.001 wt %, less than 0.0005 wt %, or less than 0.0001 wt %).

The total amount of impurities present in the core layer can be up to 0.15 wt %. Optionally, each impurity can be present in an amount of up to 0.05 wt % of the core layer. The remaining percentage of the core layer is aluminum.

The thickness of the core layer can be from 100 microns to 4000 microns. For example, the core layer can be from 150 microns to 3500 microns, from 200 microns to 3000 microns, from 250 microns to 2500 microns, from 300 microns to 2000 microns, from 350 microns to 1500 microns, from 400 microns to 1000 microns, from 450 microns to 900 microns, from 500 microns to 800 microns, or from 550 microns to 700 microns.

The alloys described above for use as the core layer are resistant to corrosion and have good mechanical properties. The alloys are formulated to produce a sacrificial band of dense precipitates at the first and second interfaces (i.e., between the core alloy and the first and second cladding layers). As used herein, sacrificial means that the dense precipitate band region will corrode in preference to the core layer. The dense precipitate band region can form during the braze cycle. This band prevents perforation of the tubes from the outside and enhances the corrosion resistance of the core layer, as described in U.S. Pat. No. 5,041,343, U.S. Pat. No. 5,037,707, and International Patent Publication No. WO 94/22633, which are incorporated by reference herein in their entireties. The band of dense precipitate typically has a thickness of about 20-50 μm (e.g., about 25-40 μm).

Cladding Layers

As described above, the brazing sheet package further includes a first cladding layer and a second cladding layer. The first cladding layer is adjacent to and contacts the first side of the core layer to form a first interface (i.e., no layers intervene between the first cladding layer and the first side of the core layer). The second cladding layer is adjacent to and contacts the second side of the core layer to form a second interface (i.e., no layers intervene between the second cladding layer and the second side of the core layer). The first and second cladding layers contain zinc. In some embodiments, the first and second cladding layers are "AA4000 series" alloys. Optionally, the alloys suitable for use as the first and second cladding layers include an alloy similar in composition to alloy AA4343, but containing a higher percentage of Zn. Additional Zn can be added to result in a total amount of Zn of from 2.7 wt % to 3.3 wt %, based on each of the first and second cladding layers. The elemental composition of such a modified alloy AA4343 is provided in Table 2.

TABLE 2

| Element | Weight Percentage (wt %) |
|---|---|
| Si | 6-13 |
| Fe | Up to 0.4 |
| Cu | Up to 0.1 |

TABLE 2-continued

| Element | Weight Percentage (wt %) |
| --- | --- |
| Mn | Up to 0.1 |
| Mg | Up to 0.15 |
| Cr | Up to 0.05 |
| Zn | 2.5-4.0 |
| Ti | Up to 0.05 |
| Sr | 0-0.02 |
| Impurities | Up to 0.15 Total |
| Al | Remainder |

Optionally, the alloys suitable for use as the first and second cladding layers include an alloy similar in composition to alloy X403, but containing a higher percentage of Zn. Additional Zn can be added to result in a total amount of Zn of from 2.7 wt % to 3.3 wt %, based on each of the first and second cladding layers, to result in an alloy designated as alloy X477. The elemental composition of such a modified alloy X403 is provided in Table 4 below.

In some embodiments, the first and second cladding layers include from 6.0-13.0 wt % of Si (e.g., from 7.0-8.0 wt % Si). For example, the first and second cladding layers can include 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, 10.0 wt %, 10.1 wt %, 10.2 wt %, 10.3 wt %, 10.4 wt %, 10.5 wt %, 10.6 wt %, 10.7 wt %, 10.8 wt %, 10.9 wt %, 11.0 wt %, 11.1 wt %, 11.2 wt %, 11.3 wt %, 11.4 wt %, 11.5 wt %, 11.6 wt %, 11.7 wt %, 11.8 wt %, 11.9 wt %, 12.0 wt %, 12.1 wt %, 12.2 wt %, 12.3 wt %, 12.4 wt %, 12.5 wt %, 12.6 wt %, 12.7 wt %, 12.8 wt %, 12.9 wt %, or 13.0 wt % Si. The first and second cladding layers can also include up to 0.4 wt % of Fe. In some embodiments, the first and second cladding layers can include 0.1 wt %, 0.15 wt %, 0.2 wt %, 0.25 wt %, 0.3 wt %, 0.35 wt %, or 0.4 wt % Fe. The first and second cladding layers can further include Cu and/or Mn in amounts of up to 0.1 wt %. In some embodiments, the first and second cladding layers can include trace amounts of one or more of Cu and Mn.

Optionally, the first and second cladding layers can further include up to 0.15 wt % of Mg. For example, the first and second cladding layers can include 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.11 wt %, 0.12 wt %, 0.13 wt %, 0.14 wt %, or 0.15 wt % of Mg. Optionally, the first and second cladding layers can further include up to 0.05 wt % each of Cr and Ti. The first and second cladding layers can include 0.01 wt %, 0.02 wt %, 0.03 wt %, 0.04 wt %, or 0.05 wt % of Cr. The first and second cladding layers can include 0.01 wt %, 0.02 wt %, 0.03 wt %, 0.04 wt %, or 0.05 wt % of Ti. In some embodiments, the first and second cladding layers can include trace amounts of one or more of Mg, Cr, and Ti.

The first and second cladding layers can further include from 2.5 wt % to 4.0 wt % of Zn. For example, the first and second cladding layers can include 2.5 wt %, 2.6 wt %, 2.7 wt %, 2.8 wt %, 2.9 wt %, 3 wt %, 3.1 wt %, 3.2 wt %, 3.3 wt %, 3.4 wt %, 3.5 wt %, 3.6 wt %, 3.7 wt %, 3.8 wt %, 3.9 wt %, or 4 wt % of Zn. Zn can diffuse into the core layer during the brazing cycle, which generates a Zn diffusion layer within the core that results in a corrosion resistant material. The first and second cladding layers can also include Sr in an amount of up to 0.02 wt % (i.e., from 0 wt % to 0.02 wt %). For example, Sr can be included in the first and second cladding layers in amount of 0.001 wt %, 0.002 wt %, 0.003 wt %, 0.004 wt%, 0.005 wt %, 0.006 wt %, 0.007 wt %, 0.008 wt %, 0.009 wt %, 0.01 wt %, 0.011 wt %, 0.012 wt %, 0.013 wt %, 0.014 wt %, 0.015 wt %, 0.016 wt %, 0.017 wt %, 0.018 wt %, 0.019 wt %, or 0.02 wt %.

The total amount of impurities present in the first and second cladding layers can be up to 0.15 wt %. Optionally, each impurity can be present in an amount of up to 0.05 wt % of the first and second cladding layers. The remaining percentage of the first and second cladding layers is aluminum.

In some embodiments, the first cladding layer and the second cladding layer are identical in composition. In other embodiments, the first cladding layer and the second cladding layer differ in composition.

The thickness of each of the first cladding layer and the second cladding layer can be up to 18% of the thickness of the core layer. For example, the first and second cladding layers can be 17.5%, 17%, 16.5%, 16%, 15.5%, 15%, 14.5%, 14%, 13.5%, 13%, 12.5%, 12%, 11.5%, 11%, 10.5%, 10%, 9.5%, 9%, 8.5%, 8%, 7.5%, 7%, 6.5%, or 6% of the thickness of the core layer.

Brazing Sheet Package

A clad metal sheet can be made from the core layer, first cladding layer, and second cladding layer using any conventional method known to those of skill in the art. For example, the clad sheet can be made by hot metal rolling or the like to bond the cladding and the core. Optionally, the clad sheet can be made by hot and cold rolling a composite cast ingot as described in U.S. Published Patent Application No. 2005/0011630, which is hereby incorporated by reference in its entirety. The resulting clad sheet provides good resistance to corrosion.

The clad sheet, once formed, can be converted to tube form by any method of tube formation known to those of skill in the art. For example, the clad sheet can be converted to tube form by folding or welding. The resulting tubes can be used, for example, in a heat exchanger.

Optionally, a fin can be attached to the sheet. In some embodiments, the fin can be a zinc-containing fin. Suitable fins for use in the packages described herein include 3913 alloy or 31420 alloy with zinc added. The zinc content in the fin can be equal to or higher than the zinc content at the surface of the clad sheet in tube form after the brazing cycle. For example, the fin can contain zinc in an amount of 1.5 wt % or more (e.g., 1.6 wt % or more, 1.7 wt % or more, 1.8 wt % or more, 1.9 wt % or more, 2 wt % or more, 2.1 wt % or more, 2.2 wt % or more, 2.3 wt % or more, 2.4 wt % or more, or 2.5 wt % or more). The fin can protect the core if the zinc diffusion zone in the tube depletes. In some embodiments, the fin can be a bare Al alloy.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

EXAMPLE 1

Clad metal sheets were prepared on a laboratory-scale, processed to final gauge, and exposed to a simulated brazing cycle. For the brazing cycle, the sheets were heated in a furnace at a rate of 25° C. per minute until a temperature of 520° C. was reached. The sheets were then heated at a rate of 13° C. per minute until a temperature of 605° C. was reached, followed by a 3 minute heat soak at 605° C. The sheets were then cooled to 570° C. in 6 minutes, and removed from the furnace to cool at room temperature. The samples were then exposed to an acid immersion test to assess their resistance to corrosion.

Preparation of Samples

The brazing sheet packages were prepared by hot rolling the components to bond the cladding and the core. The slabs were then hot and cold rolled to gauge. The cold rolled material was then slit to size and then partially annealed under nitrogen. The partially annealed material was manufactured into condensers.

The samples were prepared as brazed coupons of size 3.8×7.5 cm. As shown in Table 3, alloy X900 was used as the core for Sample AB996 and alloy X912 was used as the core for Sample AB916 and Sample A. Alloy X912 contains 0.15 wt % Ti and alloy X900 contains less than 0.1 wt % Ti. AA4343 was used as the cladding for Sample AB916 and Sample AB996. X477 was used as the cladding for Sample A. Alloy X477 contains 3 wt % Zn and alloy AA4343 contains 0.2 wt % Zn. The elemental compositions for alloys X900, X912, AA4343, and X477 are shown in Table 4.

TABLE 3

| Sample | Core | Cladding | Gauge (μm) |
|---|---|---|---|
| AB916 | X912 | 2-sided; 10% AA4343 | 260 |
| AB996 | X900 | 1-sided; 6% AA4343 | 260 |
| A | X912 | 2-sided; 8.5% X477 | 320 |
| B | X912 | 2-sided; 10% X477 | 320 |

TABLE 4

| | Core | | Cladding | |
|---|---|---|---|---|
| Element | X900 (%) | X912 (%) | AA4343 (%) | X477 (%) |
| Si | Up to 0.15 | 0.08 | 6.8-8.2 | 7.35 |
| Fe | Up to 0.25 | 0.20 | 0.8 | 0.20 |
| Cu | 0.5-0.65 | 0.57 | 0.25 | Trace |
| Mn | 1.4-1.6 | 1.50 | 0.10 | Trace |
| Mg | 0.13-0.25 | 0.10 | Trace | Trace |
| Cr | Up to 0.05 | Trace | Trace | Trace |
| Zn | Up to 0.04 | Trace | 0.20 | 3.0 |
| Ti | Up to 0.1 | 0.14 | Trace | Trace |
| Sr | 0.05 | Trace | 0.008-0.02 | 0.014 |
| Impurities | Up to 0.15 Total | 0.15 Total | 0.15 Total | 0.15 Total |
| Al | Remainder | Remainder | Remainder | Remainder |

Acid Immersion Testing

Figure 2:
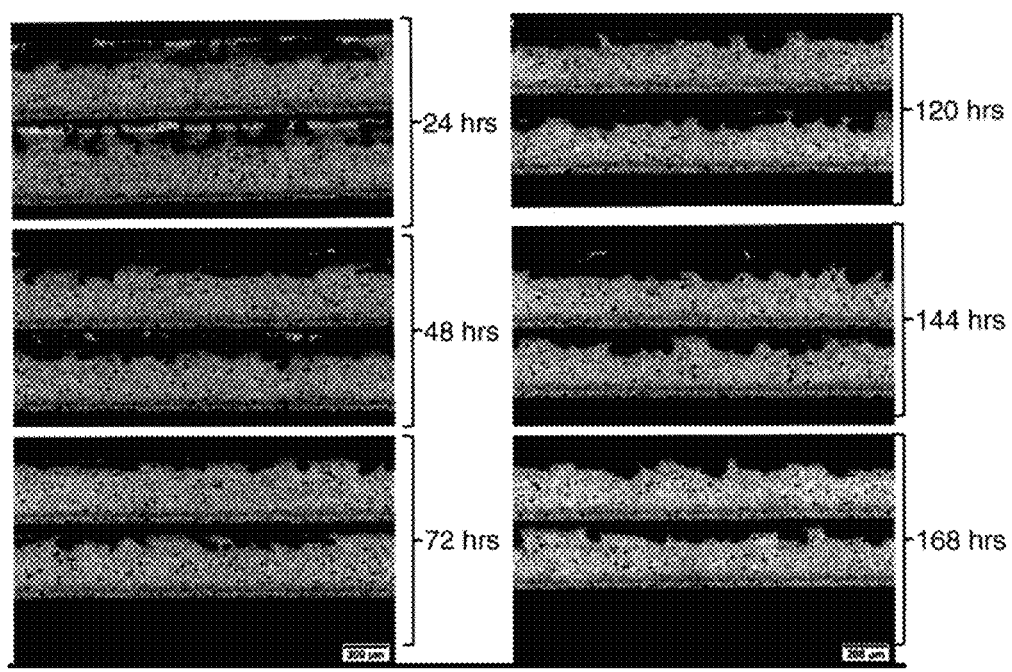
FIG. 2 contains photomicrographs showing Sample AB996 after immersion in a 0.1M HCl solution for 24 hours, 48 hours, 72 hours, 120 hours, 144 hours, and 168 hours.
Figure 3:
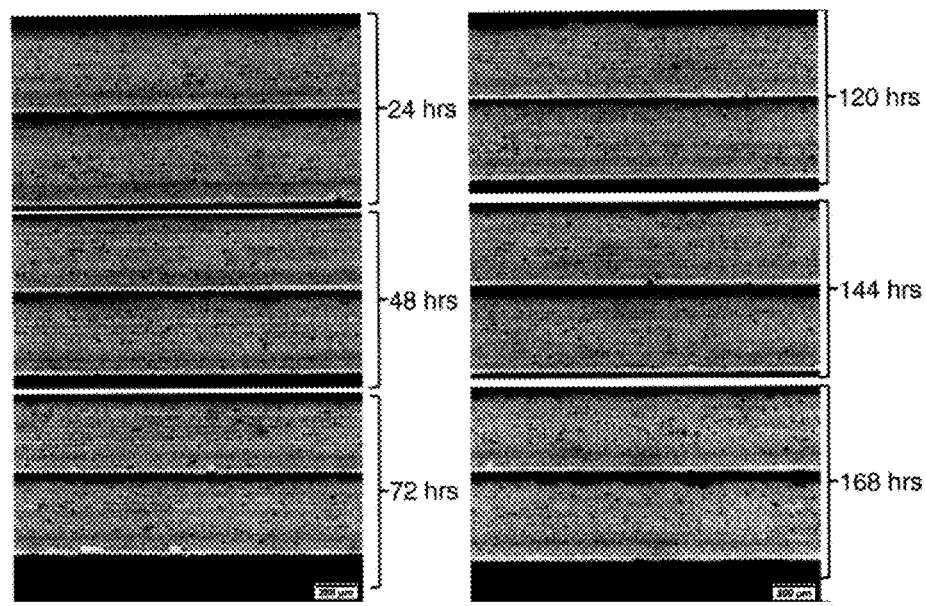
FIG. 3 contains photomicrographs showing Sample A after immersion in a 0.1M HCl solution for 24 hours, 48 hours, 72 hours, 120 hours, 144 hours, and 168 hours.
Figure 4:
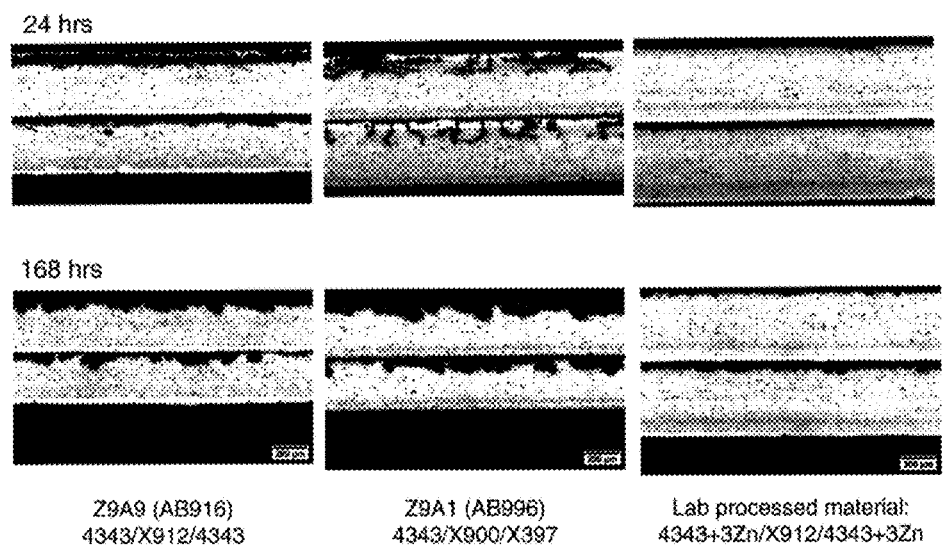
FIG. 4 contains photomicrographs showing the results of Sample AB916, Sample AB996, and Sample A (left, middle and right panes, respectively) after immersion in a 0.1M HCl solution for 24 hours and 168 hours.

The coupons were immersed in a 0.1 M HCl (pH=1) solution at room temperature for a time period of 168 hours. The levels of corrosion at time points of 24 hours, 48 hours, 72 hours, 120 hours, 144 hours, and 168 hours were assessed using metallographic examination (see FIG. 1 for Sample AB916, FIG. 2 for Sample AB996, FIG. 3 for Sample A, and FIG. 4 for a comparison of the three samples). As shown in the results, Sample A exhibited the least amount of corrosion of the three packages tested. Not to be bound by theory, the addition of 3 wt % Zn to the AA4343 cladding to provide the X477 cladding suppressed intergranular corrosion through the alpha aluminum and into the dense precipitate band. The mode of attack was changed from localized to general. Also, the Zn addition helped to slow the rate of corrosion.

EXAMPLE 2

Five core alloy variants from the X900 series were prepared containing the following elemental compositions, with the balance being aluminum:

TABLE 5

| Cast # | Si | Fe | Mn | Ti | Cu | Mg |
|---|---|---|---|---|---|---|
| PDT | 0.07 | 0.15 | 1.50 | 0.014 | 0.58 | 0.001 |
| PDU | 0.07 | 0.15 | 1.51 | 0.15 | 0.58 | 0.001 |
| PDV | 0.24 | 0.15 | 1.50 | 0.15 | 0.58 | 0.001 |
| PDW | 0.24 | 0.15 | 1.50 | 0.20 | 0.58 | 0.001 |
| PDX | 0.25 | 0.15 | 1.49 | 0.20 | 0.58 | 0.10 |

Figure 5:
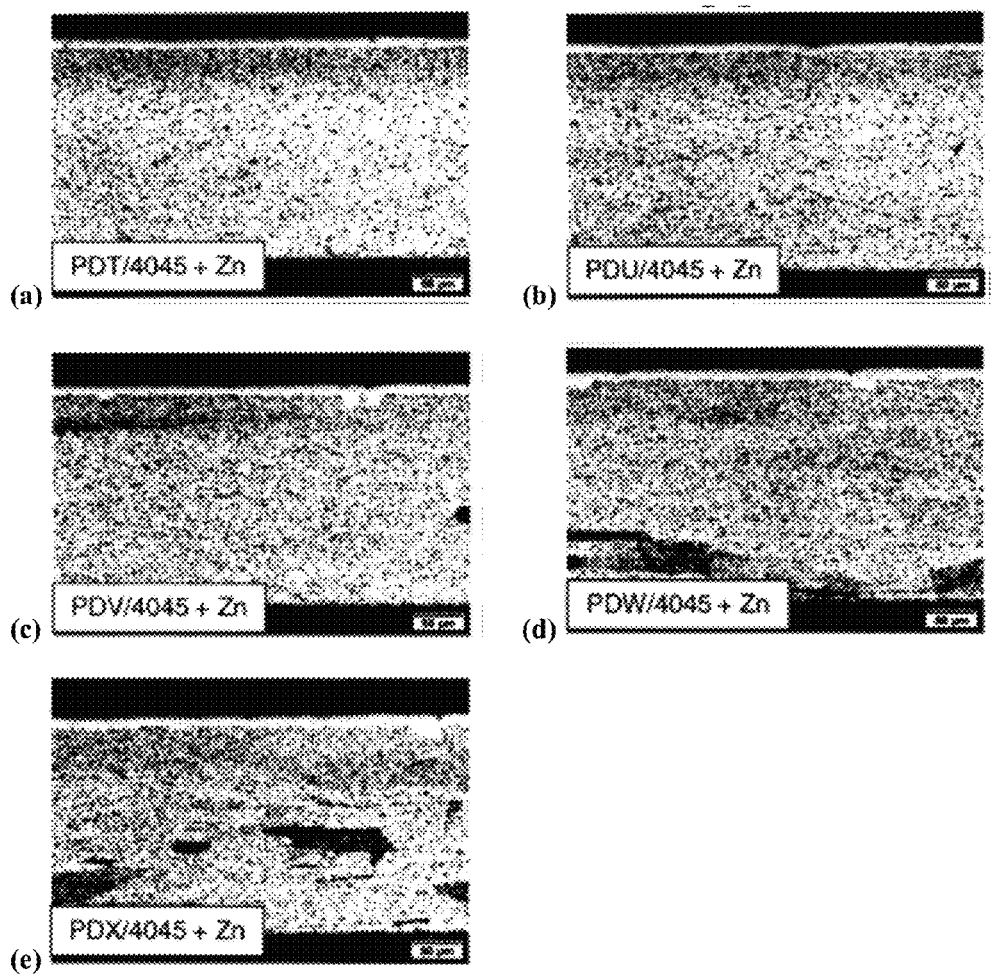
FIG. 5 contains optical microscopy images of the packages containing the 4045+1% Zn cladding. Panel (a) shows the PDT/4045+1% Zn package. Panel (b) shows the PDU/4045+1% Zn package. Panel (c) shows the PDV/4045+1% Zn package. Panel (d) shows the PDW/4045+1% Zn package. Panel (e) shows the PDX/4045+1% Zn package.
Figure 6:
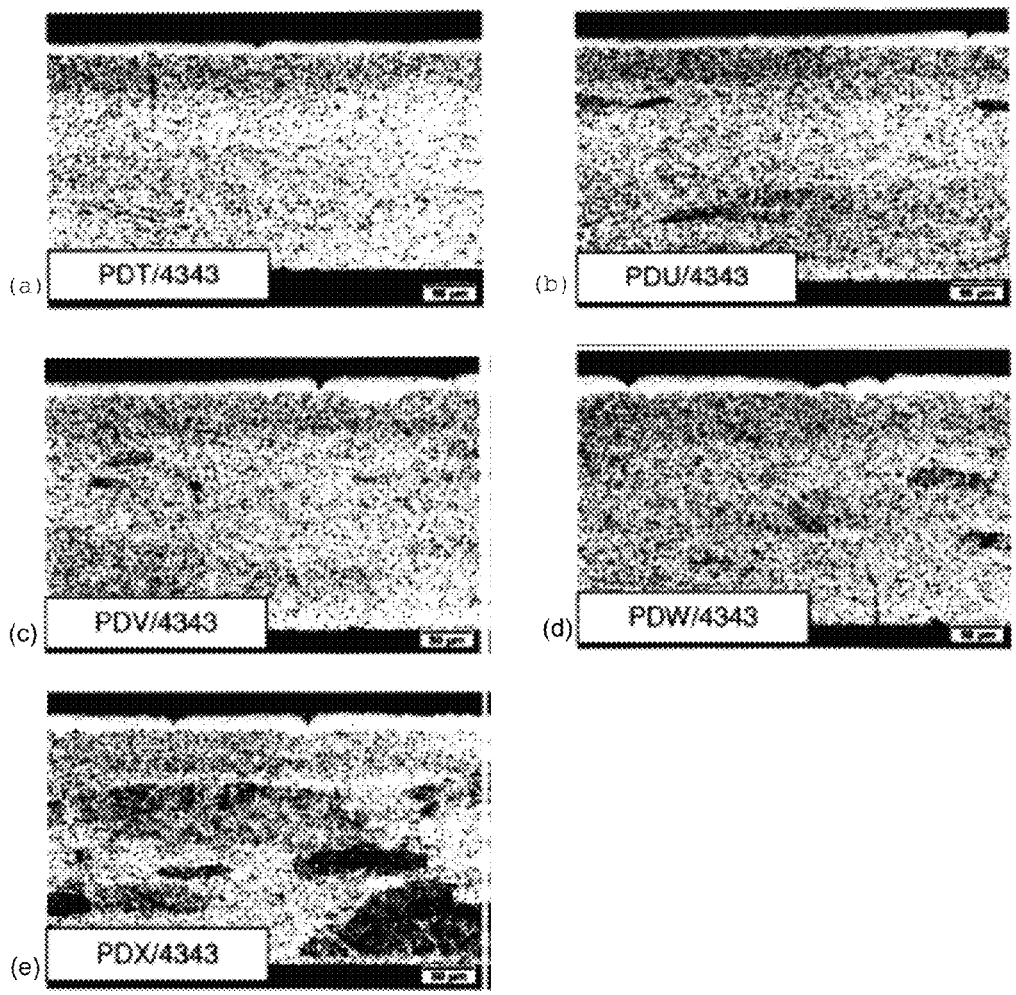
FIG. 6 contains optical microscopy images of the packages containing the 4343 cladding. Panel (a) shows the PDT/4343 package. Panel (b) shows the PDU/4343 package. Panel (c) shows the PDV/4343 package. Panel (d) shows the PDW/4343 package. Panel (e) shows the PDX/4343 package.

Each core alloy was bonded to an AA4343 clad to also to an AA4045 clad containing 1 wt % of zinc to provide 10 total packages. The packages were lab-processed to approximately 300 μm. Optical microscopy images of the packages, showing the general microstructure and the dense precipitate band, are provided in FIGS. 5 and 6. The gauge and clad thickness measurements for each of the 10 packages are shown below in Table 6.

TABLE 6

| Cast # | Cladding | Mean total gauge (μm) | Mean clad thickness (μm) | Mean % clad thickness |
|---|---|---|---|---|
| PDT | AA4045 + 1% Zn | 288.4 | 29 | 10.1 |
| PDU | | 282.1 | 30 | 10.6 |
| PDV | | 288.6 | 30 | 10.4 |
| PDW | | 288.2 | 29 | 10.1 |
| PDX | | 278.8 | 27 | 9.7 |
| PDT | AA4343 | 269.7 | 26 | 9.6 |
| PDU | | 284.9 | 30 | 10.5 |
| PDV | | 292.9 | 31 | 10.6 |
| PDW | | 291.4 | 30 | 10.3 |
| PDX | | 277.3 | 29 | 10.5 |

The 10 packages were each partially annealed and then exposed to a simulated brazing cycle as described in Example 1. The mean thickness of the dense precipitate band (DPB) was measured along with the remaining clad thickness after the brazing cycle. The measurements are listed in Table 7.

TABLE 7

| Cast # | Cladding | Mean DPB thickness (μm) | Remaining clad thickness after braze (μm) |
|---|---|---|---|
| PDT | AA4045 + 1% Zn | 46 | 15.3 |
| PDU | | 47 | 13.6 |
| PDV | | 46 | 13.1 |
| PDW | | 50 | 14.3 |
| PDX | | 44 | 15.3 |
| PDT | AA4343 | 43 | 16.2 |
| PDU | | 40 | 17.7 |
| PDV | | 46 | 19.1 |
| PDW | | 51 | 20.4 |
| PDX | | 49 | 19.9 |

Figure 7:
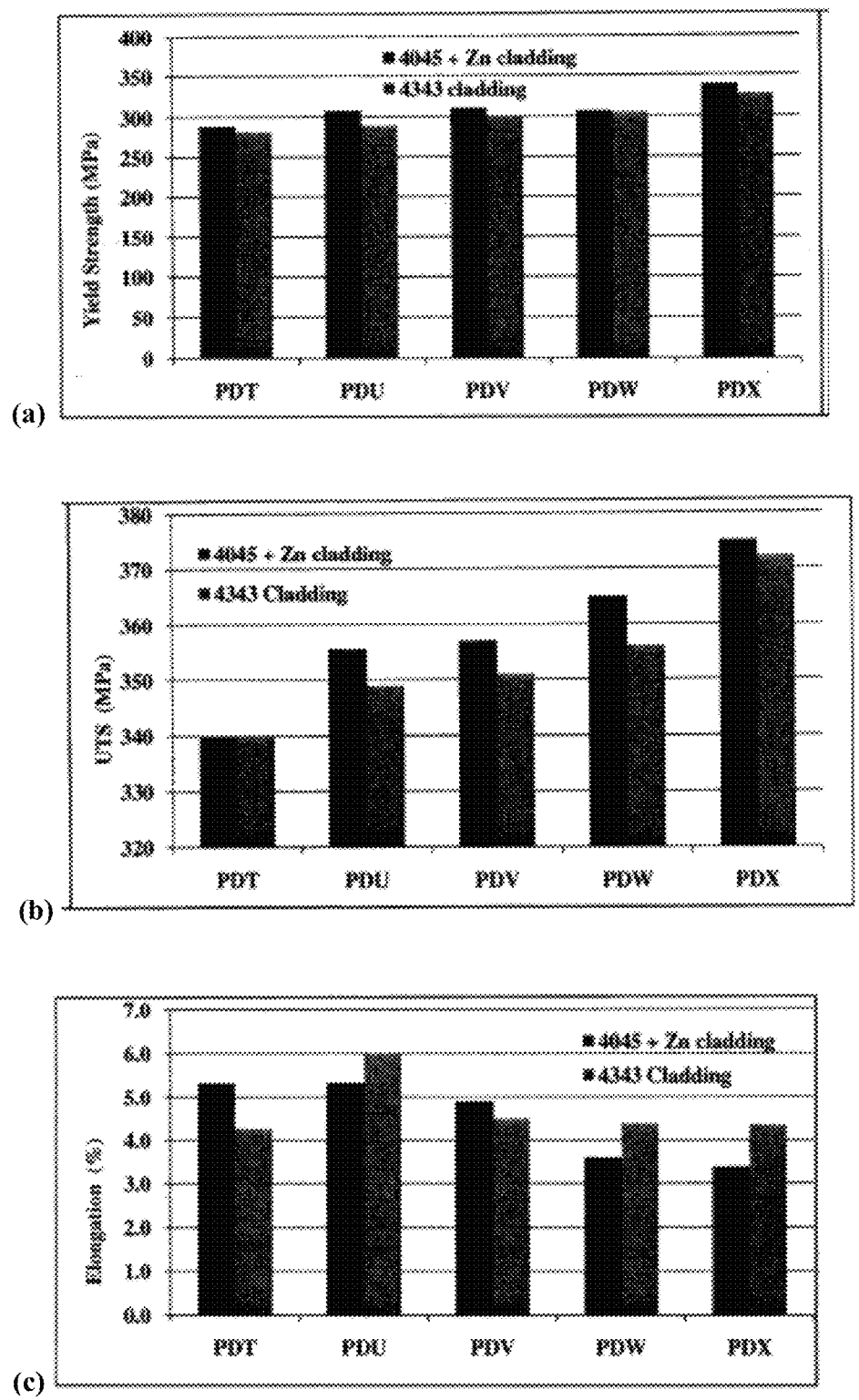
FIG. 7 shows the tensile properties of the packages as-rolled. Panel (a) shows the yield strength. Panel (b) shows the ultimate tensile strength. Panel (c) shows the percent elongation.
Figure 8:
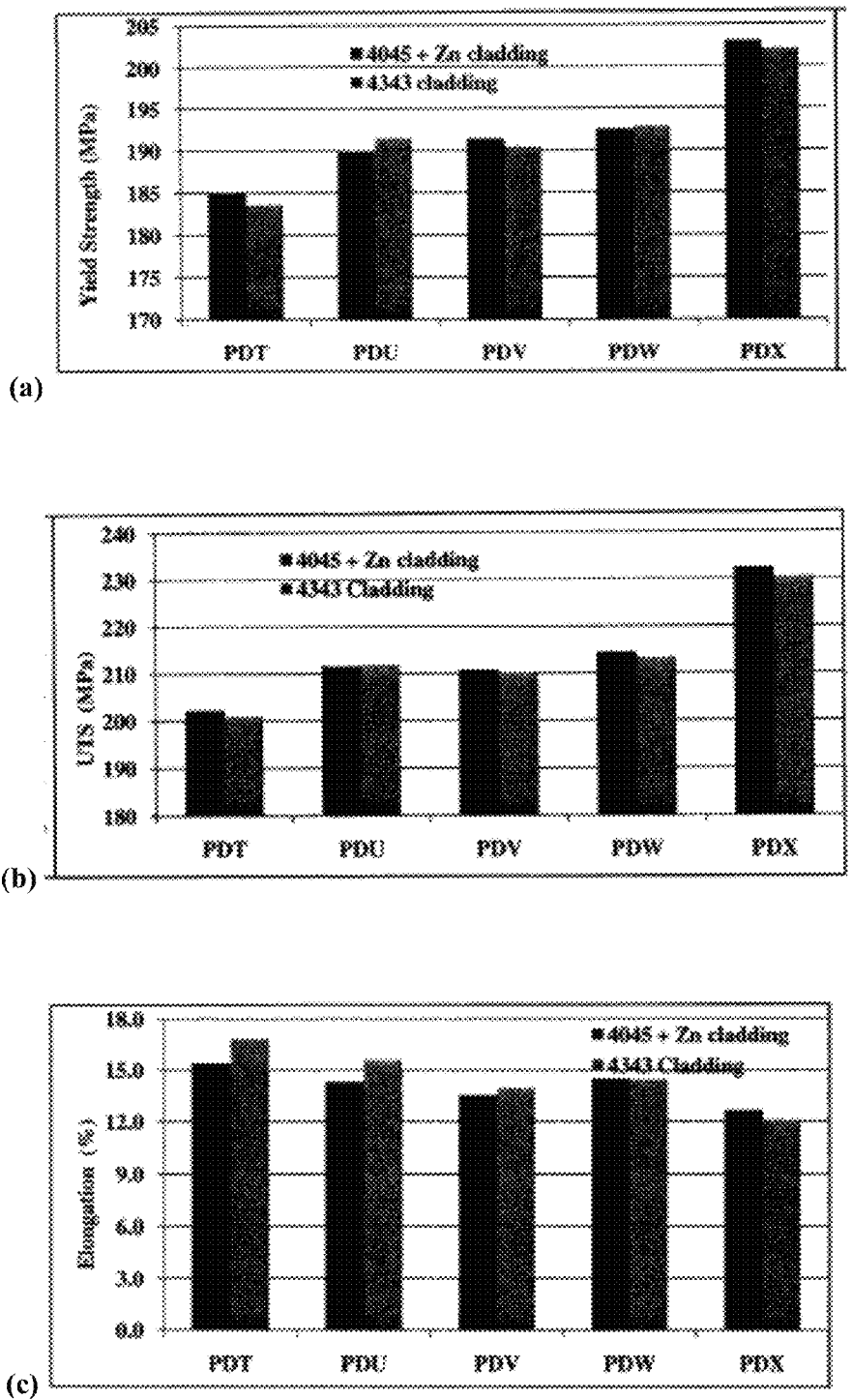
FIG. 8 shows the tensile properties of the partially annealed packages. Panel (a) shows the yield strength. Panel (b) shows the ultimate tensile strength. Panel (c) shows the percent elongation.
Figure 9:
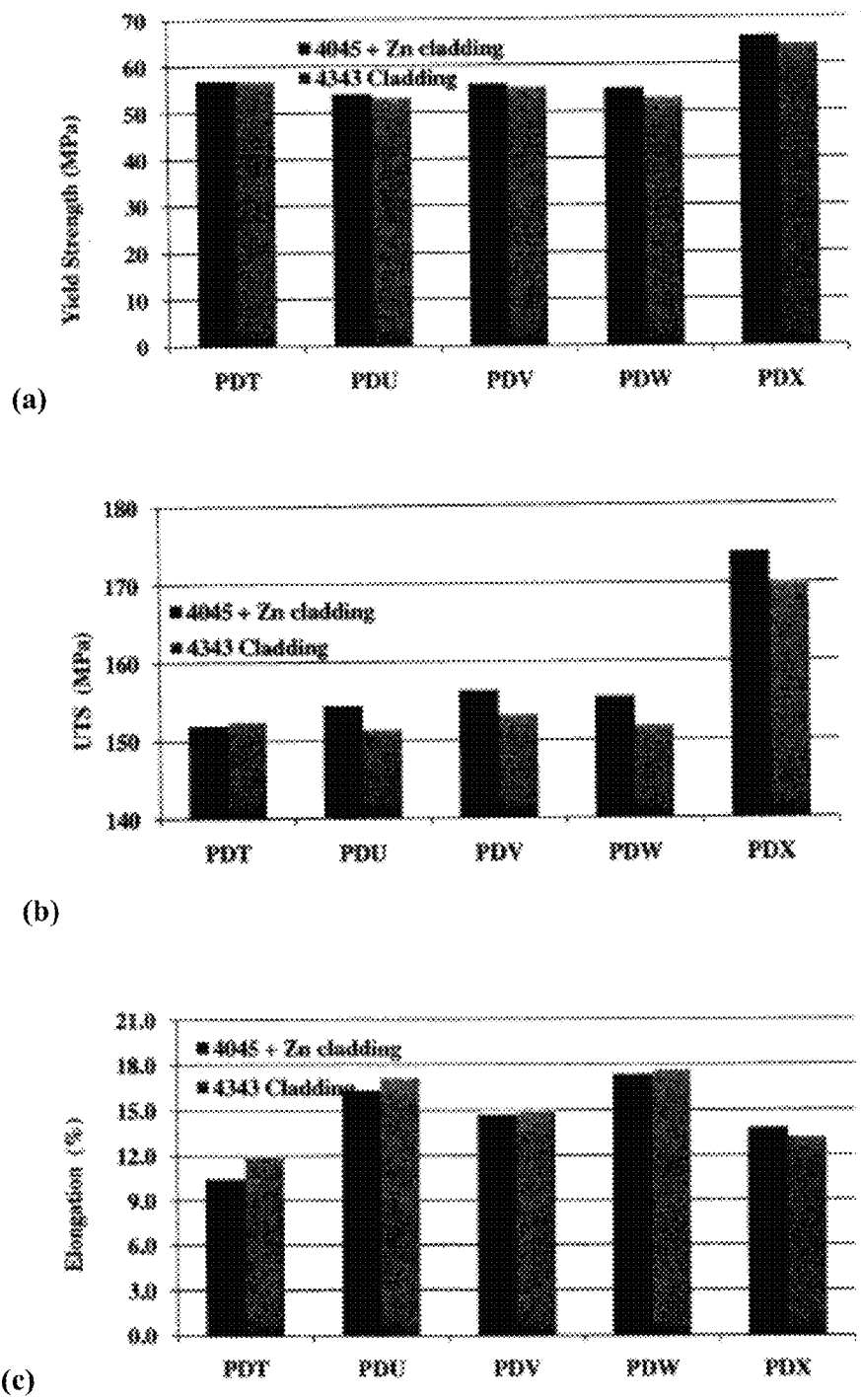
FIG. 9 shows the tensile properties of the post-brazed packages. Panel (a) shows the yield strength. Panel (b) shows the ultimate tensile strength. Panel (c) shows the percent elongation.

Tensile properties of each of the packages were determined when the packages were rolled, after the packages were partially annealed, and after the simulated brazing process. Measured tensile properties included the yield strength, percent elongation, and ultimate tensile strength. FIG. 7 provides the tensile properties of the packages as-rolled; FIG. 8 provides the tensile properties of the partially annealed packages, and FIG. 9 provides the tensile properties of the post-brazed packages.

Figure 10:
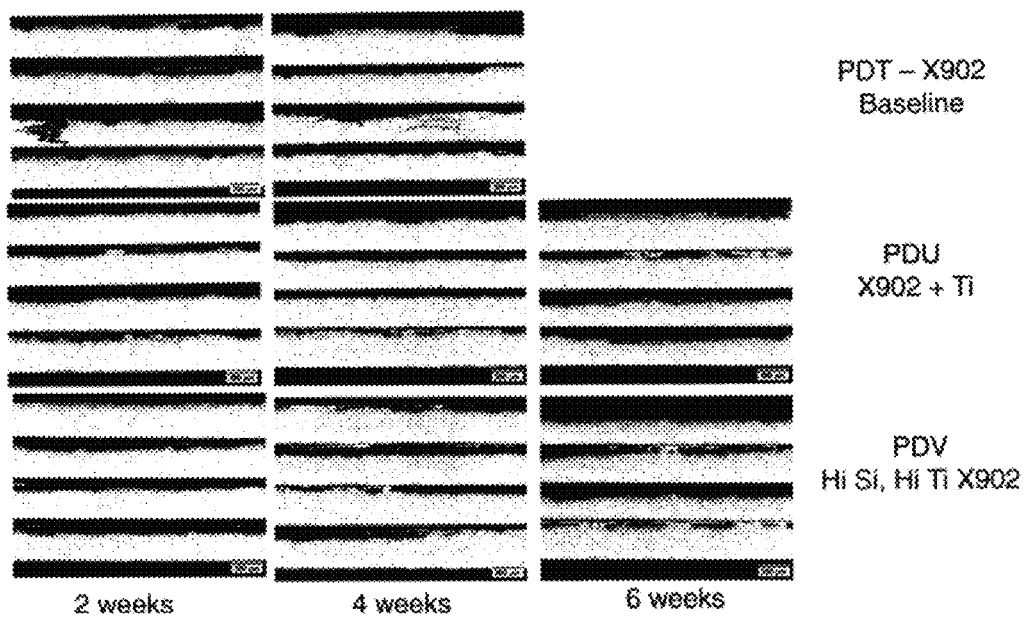
FIG. 10 shows photographs of the packages containing PDT (top panels), PDU (middle panels), and PDV (bottom panels) cores in combination with 4343 cladding after subjection to the SWAAT test for 2 weeks, 4 weeks, and 6 weeks.
Figure 11:
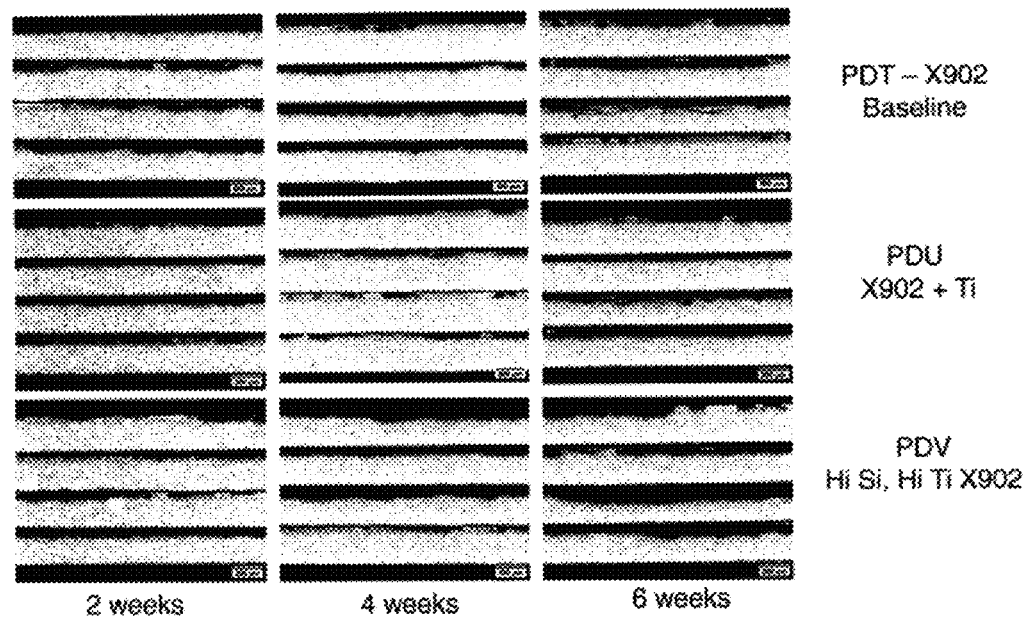
FIG. 11 shows photographs of the packages containing PDT (top panels), PDU (middle panels), and PDV (bottom panels) cores in combination with 4045 +1 wt % Zn cladding cladding after subjection to the SWAAT test for 2 weeks, 4 weeks, and 6 weeks.

The packages were subjected to accelerated airside corrosion tests. Specifically, the acidified synthetic sea water test (SWAAT test), which is based on ASTM G85:A3, was used. Photographs of the PDT, PDU, and PDV containing packages after performing the SWAAT test for 2 weeks, 4 weeks, and 6 weeks are shown in FIGS. 10 (4343 cladding) and 11 (4045+1 wt % Zn cladding).

Figure 12:
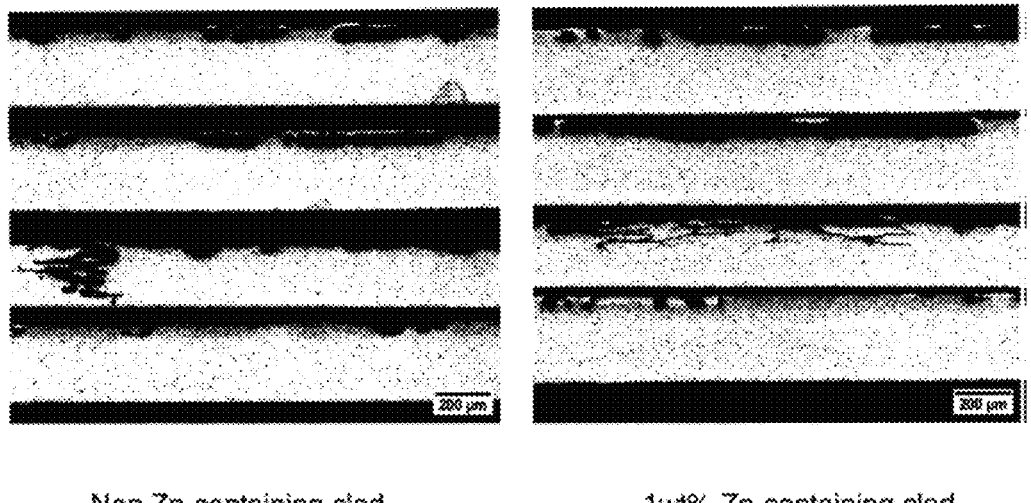
FIG. 12 shows photographs of the package including the non zinc-containing clad after being subjected to SWAAT testing for 2 weeks (left panel) and of the package including the 1 wt % zinc-containing clad after being subjected to SWAAT testing for 6 weeks (right panel).

FIG. 12 demonstrates the effect of zinc in the clads on the core alloy. As shown in FIG. 12, perforation occurred within 2 weeks in the non zinc-containing clads. However, there was no perforation after 6 weeks in the packages that included the 1 wt % zinc-containing clads.

Figure 13:
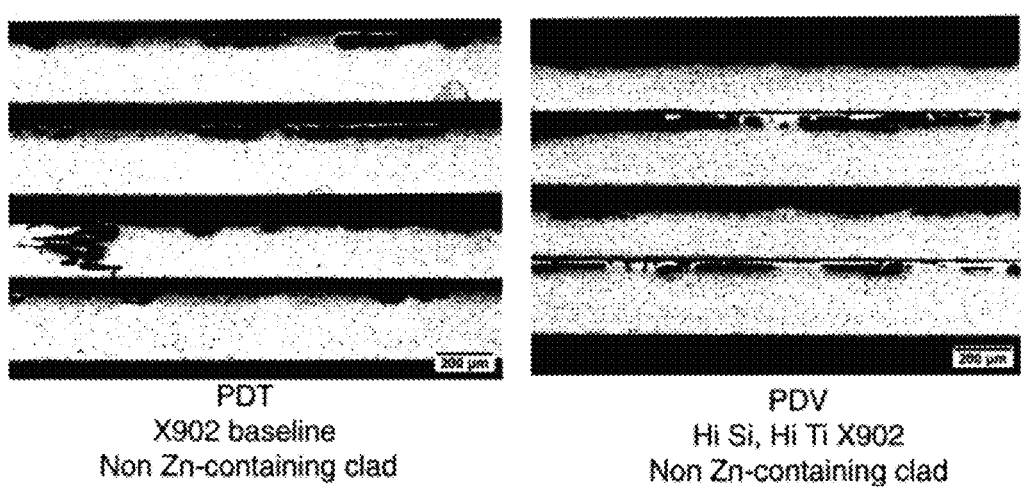
FIG. 13 shows photographs of the package including the PDT core and non zinc-containing clad after being subjected to SWAAT testing for 2 weeks (left panel) and of the package including the PDV core and the non zinc-containing clad after being subjected to SWAAT testing for 6 weeks (right panel).

FIG. 13 demonstrates the effect of increased titanium and silicon in the core alloy. As shown in FIG. 13, perforation occurred within 2 weeks in the packages containing the PDT alloy and the non zinc-containing clads. However, there was no perforation after 6 weeks in the packages that included the PDV alloy, which contains higher amounts of titanium and silicon in comparison with the PDT alloy, and the non zinc-containing clads.

The corrosion potential for each of the packages was tested according to the procedures described in ASTM G69. The open circuit potential for each package is listed in Table 8. As shown in Table 8, increasing silicon and/or titanium in the core alloy had a negligible effect on the free corrosion potential of the core alloy.

TABLE 8

| Cast # | Cladding | OCP (mV vs. SCE) |
|---|---|---|
| PDT | AA4045 + 1% | −652 |
| PDU | Zn | −654 |
| PDV |  | −650 |
| PDW |  | −652 |
| PDX |  | −649 |
| PDT | AA4343 | −660 |
| PDU |  | −651 |
| PDV |  | −655 |
| PDW |  | −652 |
| PDX |  | −653 |

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. A multi-layer metal sheet, comprising:
   a core layer of aluminum-containing alloy comprising up to 0.25 wt. % of Si, up to 0.25 wt. % of Fe, from 0.5 to 0.6 wt. % of Cu, from 1.4 to 1.6 wt. % of Mn, from 0.06 to 0.14 wt. % of Mg, up to 0.05 wt. % of Cr, up to 0.04 wt. % of Zn, from 0.1 to 0.2 wt. % of Ti, up to 0.05 wt. % of Sr, up to 0.15 wt. % impurities, and the balance aluminum, wherein the core layer has a first side and a second side;
   a first cladding layer on the first side of the core layer, wherein the first cladding layer comprises from 2.5 wt % to 4.0 wt % of zinc and from 6 wt. % to 13 wt. % of Si; and
   a second cladding layer on the second side of the core layer, wherein the second cladding layer comprises from 2.5 wt % to 4.0 wt % of zinc and from 6 wt. % to 13 wt. % of Si.

2. The multi-layer metal sheet of claim 1, wherein the first cladding layer and the second cladding layer comprise the same or different alloys.

3. The multi-layer metal sheet of claim 1, wherein the first side of the core layer is adjacent to the first cladding layer to form a first interface and the second side of the core layer is adjacent to a second cladding layer to form a second interface.

4. The multi-layer metal sheet of claim 1, wherein the first cladding layer and the second cladding layer are made of an alloy comprising from 6 to 13 wt. % of Si, up to 0.4 wt. % of Fe, up to 0.1 wt. % of Cu, up to 0.1 wt. % of Mn, up to 0.15 wt. % of Mg, up to 0.05 wt. % of Cr, from 2.5 to 4.0 wt. % of Zn, up to 0.05 wt. % of Ti, up to 0.02 wt. % of Sr, up to 0.15 wt. % impurities, and the balance aluminum.

5. The multi-layer metal sheet of claim 1, further comprising a fin.

6. The multi-layer metal sheet of claim 5, wherein the fin is a zinc-containing fin.

7. The multi-layer metal sheet of claim 6, wherein the fin contains zinc in an amount of 1.5 wt. % or more.

8. The multi-layer metal sheet of claim 5, wherein the fin is an aluminum-containing fin.

9. A tube made of the multi-layer metal sheet of claim 1.

10. The multi-layer metal sheet of claim 1, wherein the alloy of the core layer is produced by direct chill casting, followed by hot and cold rolling.

11. A heat exchanger comprising the multi-layer metal sheet of claim 1.

12. A multi-layer metal sheet, comprising:
   a core layer of aluminum-containing alloy comprising up to 0.25 wt. % of Si, up to 0.25 wt. % of Fe, from 0.5 to 0.6 wt. % of Cu, from 1.4 to 1.6 wt. % of Mn, from 0.06 to 0.14 wt. % of Mg, up to 0.05 wt. % of Cr, up to 0.04 wt. % of Zn, from 0.1 to 0.2 wt. % of Ti, up to 0.05 wt. % of Sr, up to 0.15 wt. % impurities, and the balance aluminum, wherein the core layer has a first side and a second side;
   a first cladding layer comprising from 6 to 13 wt. % of Si, up to 0.4 wt. % of Fe, up to 0.1 wt. % of Cu, up to 0.1 wt. % of Mn, up to 0.15 wt. % of Mg, up to 0.05 wt. % of Cr, from 2.5 to 4.0 wt. % of Zn, up to 0.05 wt. % of Ti, up to 0.02 wt. % of Sr, up to 0.15 wt. % impurities, and the balance aluminum; and
   a second cladding layer comprising from 6 to 13 wt. % of Si, up to 0.4 wt. % of Fe, up to 0.1 wt. % of Cu, up to 0.1 wt. % of Mn, up to 0.15 wt. % of Mg, up to 0.05 wt. % of Cr, from 2.5 to 4.0 wt. % of Zn, up to 0.05 wt. % of Ti, up to 0.02 wt. % of Sr, up to 0.15 wt. % impurities, and the balance aluminum,
   wherein the first side of the core layer is adjacent to the first cladding layer to form a first interface and the second side of the core layer is adjacent to a second cladding layer to form a second interface.

13. A tube made of the multi-layer metal sheet of claim 12.

14. The multi-layer metal sheet of claim 12, wherein the alloy exhibits the formation of a dense precipitation band during brazing which contains Si content up to 0.5 wt. % in the core alloy.

15. The multi-layer metal sheet of claim 14, wherein the difference in corrosion potential between the dense precipitation band and core (vs. Standard Calomel Electrode (SCE)) is between 30 to 40 mv.

16. The multi-layer metal sheet of claim 12, comprising a minimum yield strength of about 71 MPa and ultimate tensile strength of about 182 MPa, measured after brazing.

17. The multi-layer metal sheet of claim 12, comprising a corrosion potential of −670 mV or less in the core, measured after brazing.

18. The multi-layer metal sheet of claim 12, wherein the alloy withstands at least 28 days without perforation during airside corrosion testing after brazing.

19. A heat exchanger comprising the multi-layer metal sheet of claim 12.

* * * * *